US006873451B2

(12) United States Patent
Ukigaya

(10) Patent No.: US 6,873,451 B2
(45) Date of Patent: Mar. 29, 2005

(54) ELECTROPHORETIC DISPLAY DEVICE AND METHOD FOR DRIVING THE SAME

(75) Inventor: Nobutaka Ukigaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 10/318,059

(22) Filed: Dec. 13, 2002

(65) Prior Publication Data

US 2003/0117016 A1 Jun. 26, 2003

(30) Foreign Application Priority Data

Dec. 21, 2001 (JP) ........................................ 2001-389325

(51) Int. Cl.[7] .......................... G02B 26/00; G09G 3/34; G03G 17/04

(52) U.S. Cl. ......................... 359/296; 345/107; 430/32; 204/600

(58) Field of Search .......................... 359/296; 345/105, 345/107; 430/32, 34, 38; 204/600, 450; 252/583, 582, 586

(56) References Cited

U.S. PATENT DOCUMENTS 3,612,758 A 10/1971 Evans et al.
4,655,897 A 4/1987 DiSanto et al.
5,053,763 A 10/1991 DiSanto et al.
5,174,882 A 12/1992 DiSanto et al.
5,345,251 A 9/1994 DiSanto et al. ............. 345/107
6,611,100 B1 * 8/2003 Moore ......................... 313/582
6,639,580 B1 * 10/2003 Kishi et al. ................. 345/107

FOREIGN PATENT DOCUMENTS

JP 1-248183 10/1989

* cited by examiner

*Primary Examiner*—Hung Xuan Dang
*Assistant Examiner*—Tuyen Tra
(74) *Attorney, Agent, or Firm*—Fitzpatrick, Cella, Harper & Scinto

(57) ABSTRACT

An electrophoretic display device includes a pair of substrates arranged with a predetermined gap maintained therebetween, a dispersing fluid disposed between the pair of substrates, a plurality of charged particles mixed in the dispersing fluid, at least a pair of display electrodes arranged on one of the substrates and defining a pixel, and a guard electrode arranged in a border between adjacent pixels. The guard electrode limits the movement of the charged particles to within a single pixel when the guard electrode is biased at a potential higher than (lower than) each of the display electrodes of the two adjacent pixels with the border arranged therebetween if the particles are positively (negatively) charged.

18 Claims, 13 Drawing Sheets

INITIAL STATE

CONCURRENT WRITE ON BOTH PIXELS

WRITE HOLD

WRITE ON ONE PIXEL WITH OTHER PIXEL IN HOLD STATE

FIG.3

| | FIRST DISPLAY ELECTRODE (COMMON ELECTRODE) | SECOND DISPLAY ELECTRODE | GUARD ELECTRODE |
|---|---|---|---|
| MOVE AND DISPOSE PARTICLES ON FIRST DISPLAY ELECTRODE | 0V | +10V | +5V |
| MOVE AND DISPOSE PARTICLES ON SECOND DISPLAY ELECTRODE | 0V | −10V | +5V |
| HOLD STATE IN WHICH PARTICLES ARE DISPOSED ON FIRST DISPLAY ELECTRODE | 0V | +5V | +5V |
| HOLD STATE IN WHICH PARTICLES ARE DISPOSED ON SECOND DISPLAY ELECTRODE | 0V | −5V | +5V |

( PARTICLES POSITIVLEY CHARGED )

FIG.10A-1
FIG.10A-2
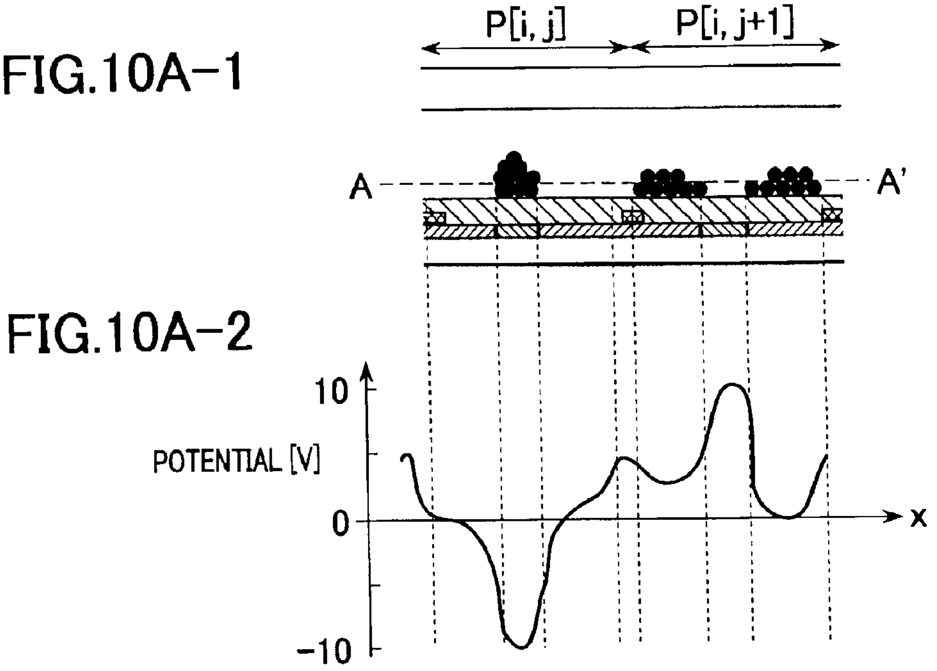
FIG.10B-1
FIG.10B-2
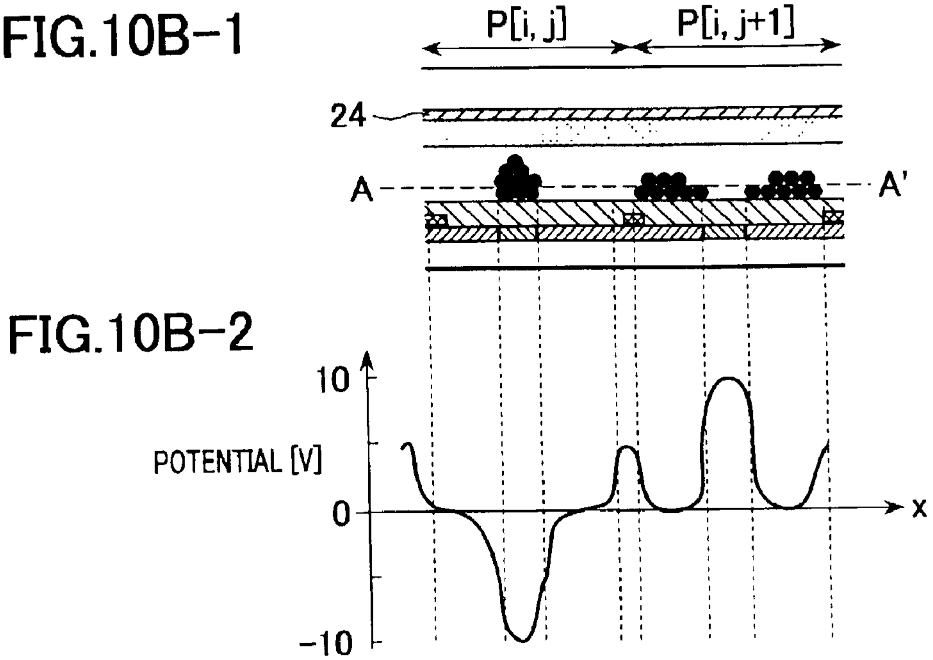

INITIAL STATE

WRITE TO PIXEL A WITH PIXEL B IN HOLD STATE

ELECTROPHORETIC DISPLAY DEVICE AND METHOD FOR DRIVING THE SAME

BACKGROUND OF THE INVENTION

1. Field of the Invention

The present invention relates to a display technique and, in particular, to an electrophoretic display device which presents an image by moving charged particles in a fluid by means of a voltage applied between electrodes.

2. Description of the Related Art

With a rapid advance of digital technology, the mount of information handled by individuals has substantially increased. Along with this, thin-structured and power-saving display devices are now being developed. Particularly, development efforts have been made on liquid-crystal display devices as a display device that satisfy these requirements.

In the currently available liquid-crystal display devices, characters presented on a screen are sometimes difficult to view depending on a viewing angle with respect to the screen or due to light reflected from the screen. Flickering of a light source and low brightness on the screen cause eye fatigue. The current liquid-crystal display devices still have room for improvements in this regard. From the standpoint of power saving and comfort to the eyes, an electrophoretic display device draws attention as a thin-structured and power saving type display. An electrode structure in a matrix display device is disclosed in U.S. Pat. No. 4,655,897.

The electrophoretic display device disclosed in U.S. Pat. No. 5,053,763 employs a group of striped electrodes to present characters. By applying a negative voltage to all striped electrodes arranged on an anode electrode structure, an "erase" mode is activated. During a "hold" mode or a "write" mode, the striped electrodes are supplied with a positive voltage. For erasure, a negative voltage is applied.

It is pointed out that when the erase mode is carried out in the electrophoretic display device, portions of character lines on both sides of a character line blocked for erasure are also erased together. A partial erasure due to interference from an adjacent pixel takes place when a plurality of character lines are erased. The characters are difficult to read in such a case. Such a display is not acceptable.

U.S. Pat. No. 5,174,882 discloses a technique which avoids a partial erasure of an adjacent line by alternately arranging a striped electrode for a character line and an anode line in an electrophoretic display device.

In this technique, the added striped electrode is supplied with a voltage having a polarity opposite from that of the anode line for erasing one selected character or a group of selected characters during a selective erase mode. The disclosure states that a difference in polarity limits an erasure of a selected anode line to a particular character in the selected anode line, and that the erasure does not spread over a character which must not be erased.

There are two types of electrophoretic display devices. A first type is discussed in detail in U.S. Pat. No. 3,612,758.

Anode lines are arranged on one substrate and cathode lines are on the other substrate paired with the one substrate. Charged particles contained in a dispersing fluid interposed between the two substrates are placed close to or away from the substrate on the user's side to present an image. This type of electrophoretic display device is referred to as a vertical movement type electrophoretic display device in this specification.

A second type is a horizontal movement type electrophoretic display device in which anode lines and cathode lines are arranged on the same substrate, and charged particles suspended in a dispersing fluid as an electrophoretic medium are collected on an anode line or a cathode line to present an image. In the horizontal type electrophoretic display device as disclosed in U.S. Pat. No. 5,345,251, a conductive strip disposed on the same substrate is used to control the movement of charged particles which electrophoretically move between the anode line and the cathode line. The erasure of a portion of an adjacent character which remains displayed rather than being erased is controlled.

The electrode structure in a conventional electrophoretic display device disclosed in U.S. Pat. No. 5,345,251 is discussed below, and the disadvantages thereof are then discussed.

FIG. 14A is a sectional view of a conventional electrophoretic display device, and is a simplified version of FIG. 4 of the specification of U.S. Pat. No. 5,345,251. Charged particles 132 and a dispersing fluid 130 are held between two substrates 100 and 102. Anode lines 120, cathode lines 122, and guard electrodes 124 are arranged on the substrate 100. The guard electrode is arranged between a pixel A and a pixel B. Grid lines 110 are arranged on the substrate 102.

FIGS. 14B-1 and 14B-2 illustrate applied voltages, and the movement of charged particles during an erase mode and a write mode.

An erase operation is carried out with an anode line 120 supplied with zero V, a cathode line 122 supplied with +12 V, and a grid line 110 supplied with zero V. All charged particles, if negatively charged, are collected on the cathode line 122 as shown in FIG. 14B-1.

To maintain this state, the grid line 110 is supplied with zero V, the anode line 120 is supplied with +15 V, and the cathode line 122 is supplied with +12 V. FIG. 14B-2 shows applied voltages and the movement of charged particles in the write operation in which the charged particles are moved to the anode line 120 in the pixel A with the state in the pixel B held. The grid line 110 is supplied with zero V. In the pixel A, the anode line 120 is supplied with +15 V, and the cathode line 122 is supplied with zero V. In the pixel B, the anode line 120 is supplied with +15 V, and the cathode line 122 is supplied with +12 V.

There is no mention of the voltage applied to the guard electrode in U.S. Pat. No. 5,345,251. A method disclosed in U.S. Pat. No. 5,174,882 is here assumed. When a particular line is erased, the anode is supplied with zero V and the cathode is supplied with +12 V. The guard electrode is thus supplied with a voltage opposite in polarity from a selection scanning line (the cathode in this case), namely, −12 V. In an adjacent line, which is in a hold state, the anode is supplied with +15 V, and the cathode is supplied with +12 V. A voltage as high as 27 V is applied between the guard electrode and the anode, thereby causing a strong electric field spreading beyond the cathode. Negatively charged particles on the cathode move to the anode, and an image which must remain displayed is disturbed.

An adjacent pixel is also affected when an image is written on a selected pixel. According to U.S. Pat. No. 5,345,251, the anode line 120 is supplied with +15 V, and the cathode line 122 is supplied with zero V in a line to which a write operation is performed as shown in FIG. 14B-2. The grid line 110 on the counter substrate is supplied with zero V corresponding to a pixel to which a write operation is performed, and is supplied with a negative voltage corresponding to a pixel on which no write operation is performed. In an adjacent line in a hold state, the anode line 120 is supplied with +15 V, and the cathode line 122 is supplied with +12 V, and a voltage difference of 12 V is applied across adjacent cathode lines 122 with the guard electrode interposed therebetween. If the guard electrode 124 is supplied with a large negative voltage, negatively charged particles on the cathode line 122 move toward the anode line 120 as in a partial erasure, and an image to be held is disturbed. This movement is represented by an arrow M1 in FIG. 14B-2. If the guard electrode 124 is biased at zero V or a positive voltage to prevent this movement, the guard electrode 124 is unable to block the electric field taking place because of the voltage difference of 12 V between the adjacent cathode lines 122. Charged particles in the pixel A in a write operation move beyond the guard electrode toward the adjacent pixel B. No correct write operation is performed. This movement is represented by an arrow M2 in FIG. 14B-2.

Unintended movement of charged particles occurs not only during the selective erasure but also during a selective write operation. To avoid the unintended movement of the charged particles, the guard electrode must be biased at a proper voltage. The conventional art disclosed in U.S. Pat. Nos. 5,174,882 and 5,345,251 fail to provide a proper guideline of bias voltage setting.

SUMMARY OF THE INVENTION

The present invention relates to an electrophoretic display device for presenting a display by moving charged particles between a pair of display electrodes across which a voltage is applied. The electrophoretic display device includes a pair of substrates arranged with a predetermined gap maintained therebetween, a dispersing fluid disposed between the pair of substrates, a plurality of charged particles mixed in the dispersing fluid, at least a pair of display electrodes arranged on one of the substrates and defining a pixel, and a guard electrode arranged in a border between two adjacent pixels, wherein the guard electrode limits the movement of the charged particles to within a single pixel and (1) wherein the guard electrode is set at a potential higher than that of each of the display electrodes of the two adjacent pixels with the border therebetween if the particles are positively charged, or (2) wherein the guard electrode is set at a potential lower than that of each of the display electrodes of the two adjacent pixels with the border if the particles are negatively charged.

Further objects, features, and advantages of the present invention will be apparent from the following description of the preferred embodiments with reference to the attached drawings.

BRIEF DESCRIPTION OF THE DRAWINGS

FIGS. 2A–2D are sectional views of a pixel P[i,j] and a pixel P[i,j+1] in the display device of the first embodiment of the present invention, wherein FIG. 2A shows an initial state with all pixels reset to black, FIG. 2B shows the pixel P[i,j] written in white and the pixel P[i,j+1] written in black, FIG. 2C shows the pixels remaining in the state written in FIG. 2B, and FIG. 2D shows the pixel P[i,j] written in black and the pixel P[i,j+1] remaining in a hold state;

FIG. 3 shows an example of applied voltages of the display device of the first embodiment of the present invention;

FIGS. 10A-1, 10A-2, 10B-1 and 10B-2 show voltages in the display device of the sixth embodiment;

FIGS. 14A, 14B-1 and 14B-2 show a conventional electrophoretic display device and problems thereof.

DESCRIPTION OF THE PREFERRED EMBODIMENTS

Figure 1A:
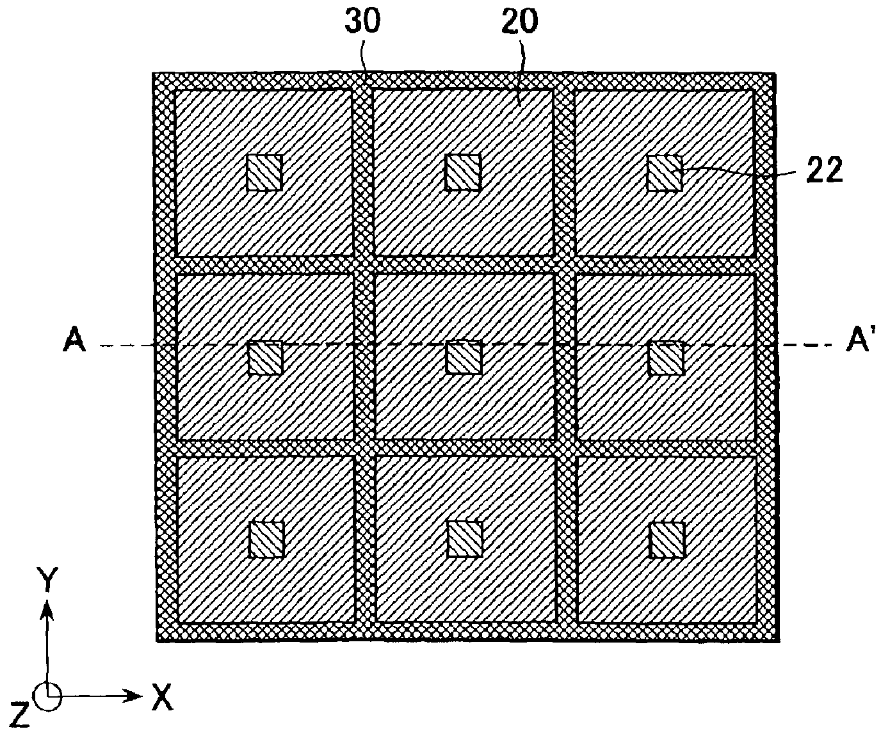
FIGS. 1A and 1B show a display device of a first embodiment of the present invention, wherein the display device includes a first substrate 10, a second substrate 12, first display electrodes 20 and second display electrodes 22 for providing different voltages on the first substrate 10, a dispersing fluid 50 arranged in the gap between the two substrates 10 and a plurality of charged particles 52 spread in the dispersing fluid 50.
Figure 1B:
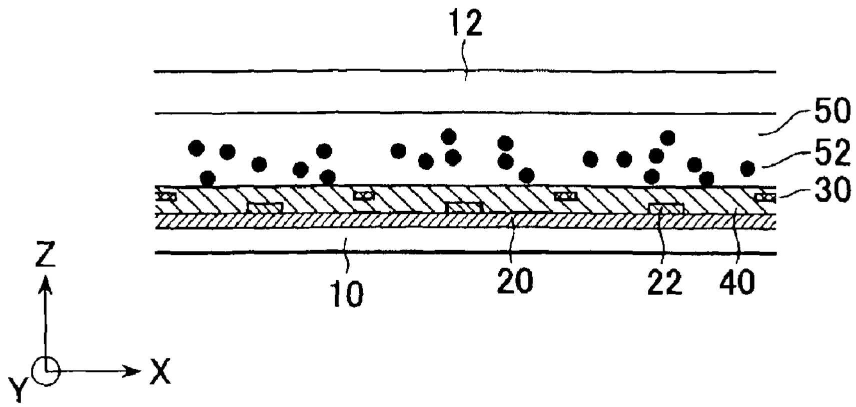

FIGS. 1A and 1B show an electrophoretic display device of a first embodiment of the present invention. Referring to FIG. 1A, the electrophoretic display device of the first embodiment includes a plurality of pixels arranged in a matrix configuration in an X-Y plane. In a sectional view in FIG. 1B, taken along line A–A' in FIG. 1A, the electrophoretic display device includes a first substrate 10 and a second substrate 12 with a predetermined gap maintained therebetween in the Z direction, a dispersing fluid 50 encapsulated between the two substrates 10 and 12, and a plurality of charged particles 52 dispersed into the dispersing fluid 50. A pair of display electrodes 20 and 22 for driving the charged particles 52 are arranged in each pixel. A voltage is applied between the two display electrodes 20 and 22, and the charged particles 52 are moved between the display electrodes 20 and 22 depending on the polarity of the applied voltage.

Adjacent display pixels form a unitary structure and are biased at the same potential. A guard electrode 30 is arranged in the border between the pixels to limit the movement of the charged particles to within the pixel.

The guard electrode 30 of the present invention has the function of a "striped electrode" or the function of preventing a partial erasure in an adjacent pixel in an erasure operation of a particular line. These functions, however, are not sufficient to resolve the interference between the adjacent pixels, or inter-pixel interference. The adjacent pixel interference is the problem addressed by the present invention. The control of electric field is required from the following standpoints.

1. Barrier of the Potential

The guard electrode 30 must have the function of preventing charged particles suspended in the vicinity of the border of a pixel from drifting beyond the border of the pixel. In accordance with the present invention, the guard electrode 30 is set to be higher in potential than a display electrode in the vicinity thereof when the particles 52 in the dispersing fluid 50 are positively charged. When the particles 52 are negatively charged, the guard electrode 30 is set to be lower in potential than the display electrode. The dispersing fluid 50 serves as a potential barrier when viewed from the charged particles 52.

The electrode for blocking the inter-pixel interference is thus referred to as the guard electrode in the present invention. If the potential of the guard electrode 30 is set as described above, an electric field is generated and acts on positively charged particles 52 in the vicinity of the border of a pixel in a direction running to the inside of the pixel (in case of negatively charged particles, an electric field acting in the opposite direction is generated). That electric field is hereinafter referred to as a barrier electric field. The barrier electric field prevents charged particles 52 from drifting beyond the border and from leaking into an adjacent pixel.

The distribution of the electric field is determined not only by the voltage of the guard electrode 30 and the display electrode 20 in contact therewith, but also by the voltage of the display electrode 22 of the two adjacent pixels. In the electrophoretic display device of the present invention in which a pair of display electrodes and a guard electrode are arranged on one substrate, the electric field generated by the voltage of the guard electrode 30 and the display electrode 20 in contact therewith is intensified as it runs close to the border of the pixel. The effect of the potential of other electrodes is relatively weak there. In the horizontal movement type electrophoretic display device, a number of particles move near the substrate in the vicinity of the electrode. To prevent the charged particles from moving beyond the pixel border, a sufficiently strong localized electric field must be generated close to the pixel border. To this end, the potential of the guard electrode 30 and the display electrode 20 in contact therewith are set as described above regardless of the potential of other electrodes. The guard electrode serves as an electric barrier to the majority of charged particles 52.

All particles do not always move near the electrode of the substrate in the horizontal movement type electrophoretic display device. This will be discussed in more detail later.

The pixels on both sides of the guard electrode are independently driven. To maintain the barrier electric field at a constant intensity, it is contemplated that the guard electrode is controlled on a pixel by pixel basis in accordance with the voltage of each pixel electrode. This arrangement is not preferable because of its complex electrode structure and complex driver circuit. The area of the guard electrode 30 is preferably small to assure a large aperture ratio. The guard electrode 30 is preferably shared by adjacent pixels.

When the electrodes on both sides of the guard electrode 30 vary in potential with the particles positively charged, the guard electrode 30 must be high in potential with respect to the variation. But the potential of the guard electrode 30 is subject to an upper limit. To set the voltage with a sufficient margin, the potential of the display electrodes on both sides of the guard electrode 30 are preferably maintained at the same and constant value.

Referring to FIG. 1B, the guard electrode 30 is laminated on the display electrode. The display electrodes of adjacent pixels coming under the guard electrode are electrically connected to each other, and are set to be to the same potential. A display electrode shared by pixels is referred to as a first display electrode, and the other display electrode paired with the first display electrode is referred to as a second display electrode.

2. Hold State of Display

Figure 14A:
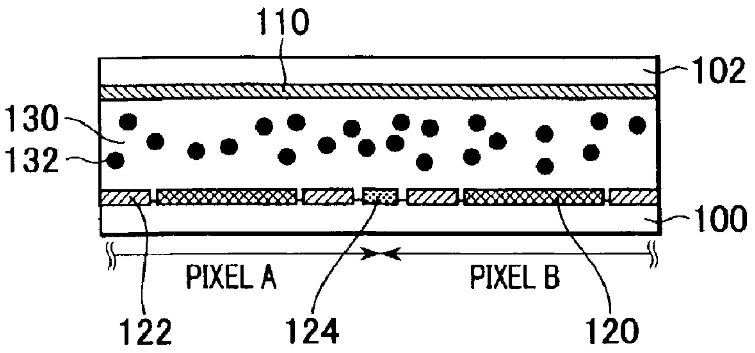

The voltage G [V] applied to the guard electrode is appropriate in level if no charged particles 132 move from a pixel A to a pixel B in FIG. 14A, and if the charged particles 132 to be held on the cathode of the pixel B are not repelled. Now the positively charged particles are considered. When the pixel A is selected for writing, let G(a) represent the lower limit of voltage that does not move the charged particles 132 from the pixel A to the pixel B, and let G(b) represent the upper limit of voltage that does not repel the charged particles 132 on the cathode of the pixel B, and the following relationship holds.

$$G(a) \leqq G \leqq G(b)$$

As already discussed in connection with the problems of the conventional art, the charged particles 132 in the pixel A in the vicinity of the pixel B tend to move to the pixel B when the applied voltage G is lower than G(a). This problem is resolved by generating the barrier electric field.

When the applied voltage G is higher than G(b), the charged particles 132 to be held on the cathode line in the pixel B tend to move away from the guard electrode under a reaction force from the guard electrode. The voltage value applied to the guard electrode must be set so that the charged particles drifting toward the pixel border are spaced away from the pixel border not to move beyond the pixel border while charged particles on one of the pair of display electrodes (the one closer to the pixel border or in contact with the pixel border, namely, the first display electrode in FIG. 1) must stay in the pixel which holds a display state.

The potential of the guard electrode with respect to the first display electrode is set to be within a range from a lower limit which is sufficient to create a strong barrier electric field in the pixel border to an upper limit which is below a voltage required to create a threshold electric field that moves the charged particles on the first display electrode.

If the relationship $G(a) \leqq G(b)$ holds, the above setting becomes possible. The electric field created by the guard electrode is sufficiently strong in the vicinity of the guard electrode, and weakens with distance therefrom. The lowest voltage G(a) for moving the charged particles in the vicinity of the barrier electrode is always smaller than the lowest voltage G(b) for moving the charged electrodes on the display electrode. The above relationship holds in principle.

Controlling the movement of charged particles in a balanced manner by the potential of the guard electrode only is practically difficult considering a corner of each pixel and charged particles suspending away from the substrate. The following discussion focuses on the generation of electric field from other components than the guard electrode.

3. Generation of Electric Field on the Display Electrode

As already discussed, preferably, the guard electrode and the first display electrode are electrically connected to each other in the entire display area, and are biased at a constant potential. In this case, the control of the movement of the charged particles is performed by the voltage applied to a second electrode which is independently arranged for a corresponding pixel. One method of satisfying the condition of $G \leqq G(b)$ for holding the state of the charged particles in the pixel B is that a second display electrode of a pixel holding a state is adjusted in accordance with G, and an electric field is generated to cancel a repellant force acting on the charged particles in the pixel in the hold state under the presence of the barrier electric field. Such an electric field in the opposite direction is generated by setting the potential of the second display electrode in the middle between the potential of the guard electrode and the potential of the first display electrode.

The electric field in the opposite direction is generated to maintain the charged particles on the first display electrode. When the charged particles are placed on the second display electrode, the opposite electric field is not necessary. Since the opposite electric field moves the charged particles on the second display electrode to the first display electrode, the presence of the opposite electric field is undesirable.

4. Localized Electric Field Caused by the Guard Electrode

An excessively strong barrier electric field moves particles from within a pixel that needs to hold the state thereof. The barrier electric field generated by the guard electrode reduces or eliminates the interference between the adjacent pixels. It is not preferred that the barrier electric field affects a write operation. The electric field caused by the guard electrode is preferably localized in the vicinity of the guard electrode and an extra electric field affecting the write operation is preferably reduced.

Figures 1, 14B:
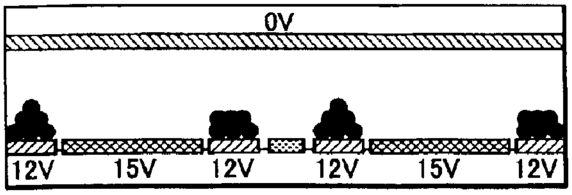

To localize the electric field caused by the guard electrode, the guard electrode is laminated on the pixel display electrode as shown in FIG. 1 rather than being horizontally arranged to be flush with the display electrode in the same plane. A laminate structure allows the guard electrode and the display electrode to be closer in distance by adjusting the thickness of an insulator sandwiched therebetween than in the horizontal arrangement of the electrodes. The electric field is thus more concentrated surrounding the guard electrode.

Figure 6:
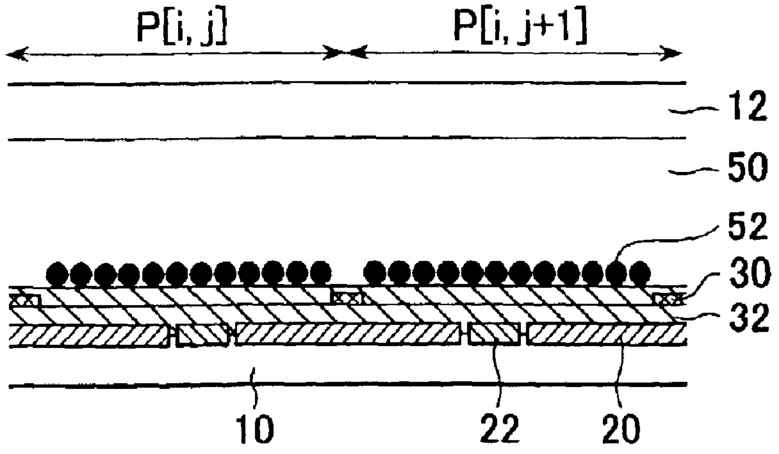
FIG. 6 shows the display device having an electric shield electrode in accordance with a third embodiment of the present invention.

It is sometimes required that the guard electrode be positioned at a level as high as possible from the substrate by thickening the insulator. Referring to FIG. 6, an electric shield electrode 32 at the same potential as the display electrode is preferably arranged right below the guard electrode 30. Electric lines of force running out from the guard electrode are absorbed by the electric shield electrode 32 and the barrier electric field is thus localized.

5. Barrier Effect of the Guard Electrode

The intensity of the barrier electric field is significantly large in the vicinity of the guard electrode. However, above the guard electrode, the intensity of the electric field weakens in inverse proportion to the square of distance from the guard electrode. The effect of the electric field is not sufficient to charged particles at locations spaced from the guard electrode. To exploit the effect of the barrier to reduce or eliminate interference between the adjacent pixels, the intensity of the electric field must remain strong at a location spaced from the guard electrode.

Figure 7:
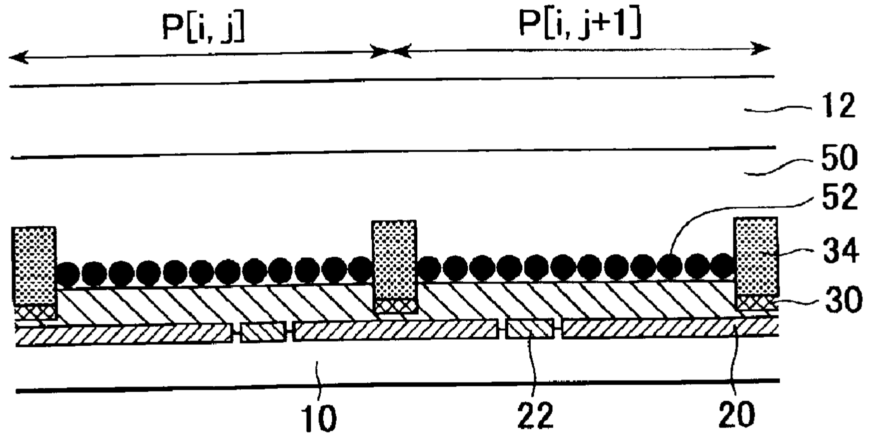
FIG. 7 shows the display device having an electric shield electrode in accordance with a fourth embodiment of the present invention.

FIG. 7 shows one pixel construction having a rib structure on the guard electrode 30. The electric lines of force running out of the guard electrode converge into the rib structure through the dielectric effect thereof, and then run out from the top of the rib structure. The horizontally aligned electric field is thus lifted from the plane of the display electrode. The dielectric constant of the rib structure is set to be larger than that of the dispersing fluid 50.

Figure 8:
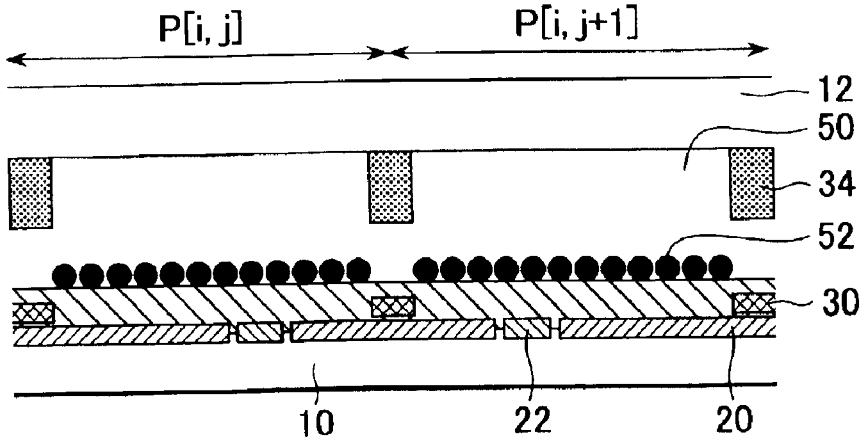
FIG. 8 shows the display device having a rib structure in accordance with a fifth embodiment of the present invention.

FIG. 8 shows another pixel construction. A rib structure is arranged on the counter substrate facing the guard electrode 30. Charged particles drifting near the counter substrate are blocked by the rib structure and do not leak into an adjacent pixel. The electric lines of force surrounding the rib structure are spaced away from the rib structure by selecting the material of the rib structure having a dielectric constant smaller than that of the dispersing fluid 50. The horizontal component of the electric field right below the rib structure is thus enlarged.

Figure 12A:
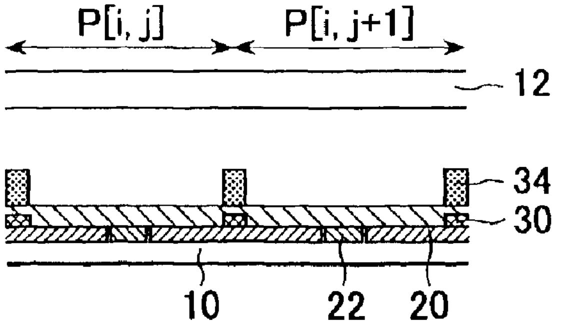
FIGS. 12A–12E show the display device having a rib structure in accordance with an alternate embodiment of the present invention.
Figure 12B:
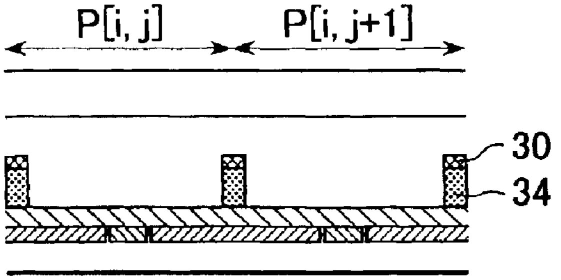
Figure 12C:
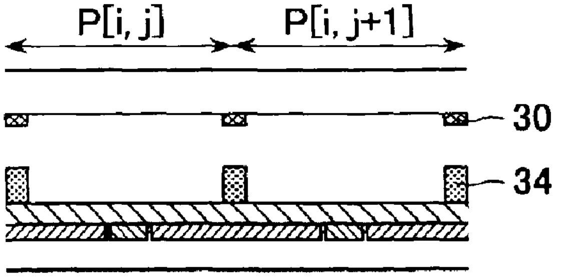
Figure 12D:
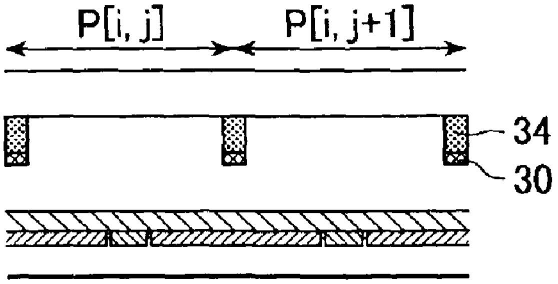
Figure 12E:
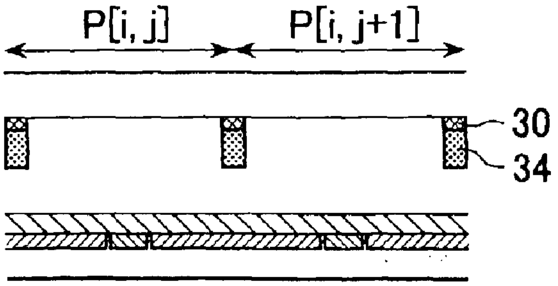

FIGS. 12A–12E show other physical guard electrodes. Referring to FIGS. 12B and 12E, the guard electrode is placed on top of the rib structure. A guard electrode may be formed on the top portion of the rib structure. Referring to FIGS. 12A, 12C, and 12D, the guard electrode is arranged below, above, or on the bottom of the rib structure. At each structure shown, the barrier electric field is lift upward.

The embodiments of the present invention provide the layout of the electrodes, the pixel construction, and the driving method of the pixel to generate the electric field meeting the above five factors. The embodiments of the present invention thus reduces or eliminates the inter-pixel interference that results in an unintended display.

Other features of the present invention will now be discussed.

In a preferred embodiment, the first display electrode 20 of each pixel is positioned outside the pixel and adjacent to the guard electrode, and the second display electrode 22 is positioned inside the pixel and surrounded by the guard electrode 30 as shown in FIG. 1. Since the guard electrode 30 is formed to surround each pixel, the leak of charged particles to any direction is controlled. The second display electrode 22 is driven by a switching element such as an MIM or TFT (Thin-Film Transistor) (not shown). The dot-like second display electrode 22 is arranged on the first display electrode 20 in a single pixel. The shape of each electrode and the number of electrodes in each pixel are not limited to those discussed here.

Figure 4A:
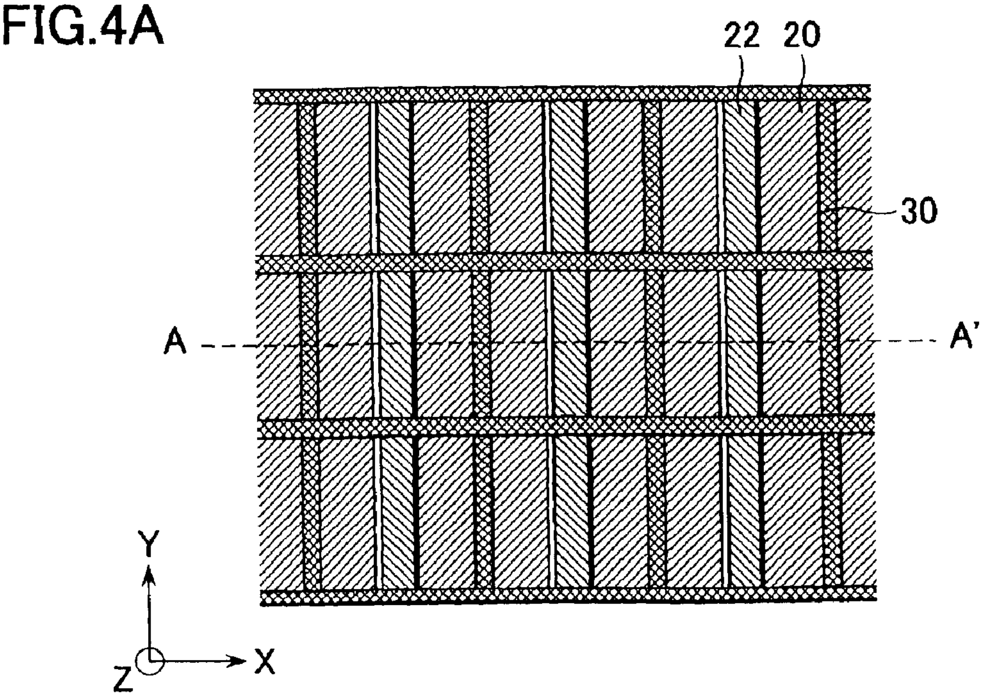
FIGS. 4A and 4B show the display device having striped electrodes in accordance with a second embodiment of the present invention.

FIG. 4A shows a display device in which the second display electrode 22 is formed in a striped configuration. In this case, the voltage setting of the electrodes is performed so that a barrier electric field is also generated where the guard electrode 30 is adjacent to the second display electrode 22.

Referring to FIG. 1, the second display electrode 22 overlaps the first display electrode 20. Alternatively, the second display electrode 22 may be arranged in the same plane as that for the first display electrode 20 so that no overlapping portion occurs.

With its continuously extending line, the guard electrode 30 fully surrounds each pixel along the border thereof. Alternatively, the guard electrode 30 may be formed of discontinuous lines with gaps therebetween, and may surround each pixel along the border thereof. For example, two sides of the four sides of each pixel are provided with the guard electrode 30, and the remaining two sides are provided with a structure. Within a range where interference taking place between the adjacent pixels does not significantly degrade the quality of image, the guard electrode 30 may be broken into segments electrically connected together.

The guard electrode 30 arranged in the border is formed of lines which are connected together and biased at the same potential as shown in FIG. 1A. When the first display electrode 20 is partitioned into lines and the lines are supplied with different voltages during a time division driving mode, the guard electrode 30 is also broken into segments, and the segments are supplied with voltages matching the voltages applied to the first display electrode 20. A constant barrier electric field is thus generated.

The materials of the components forming the electrophoretic display device of the present invention are discussed below. The electrodes may be fabricated of inorganic or organic electrically conductive materials. Each electrode is produced through a photolithographic process and an etching process. The electrodes may be fabricated of one of Au, Al, Ti, TiC, Cu, ITO, ATO, FTO, and AZO, or an electrically conductive transparent material such as a metal thin film, an electrically conductive nitride film, an electrically conductive boride film, or an electrically conductive organic film. The insulator may be fabricated of one of acrylic resin, epoxy resin, polyimide resin, norbornane resin, and $SiO_2$.

The material of the structure of the device preferably has transparency, and the dispersing fluid and the viewer's side substrate preferably match each other in refractive index. Specifically, the material of the structure of the device may be organic or inorganic, for example, may be one of $SiO_2$, acrylic resin, epoxy resin, norbornane resin, and fluorine based resin. When the display device of the present invention is of a reflective type, the guard electrode 30, arranged on the first display electrode 20 and the second display electrode 22, is preferably fabricated of an electrically conductive light-transmissive material. The guard electrode 30, if non-transmissive, covers a reflective surface therebelow, thereby decreasing display contrast. The electrically conductive light-transmissive material may be one of Ti, Cu, ITO, ATO, FTO, and AZO, or an electrically conductive light-transmissive material such as a metal thin film, an electrically conductive nitride film, an electrically conductive boride film, or an electrically conductive organic film. As is well known to those skilled in the art, the use of a light-transmissive material for the guard electrode 30 advantageously increases a display contrast even if the display device is of a transmissive type. The present invention is effective for the inter-pixel interference in a microcapsule type electrophoretic display device in which charged particles and an electrophoretic medium are contained in a capsule.

Figure 2A:
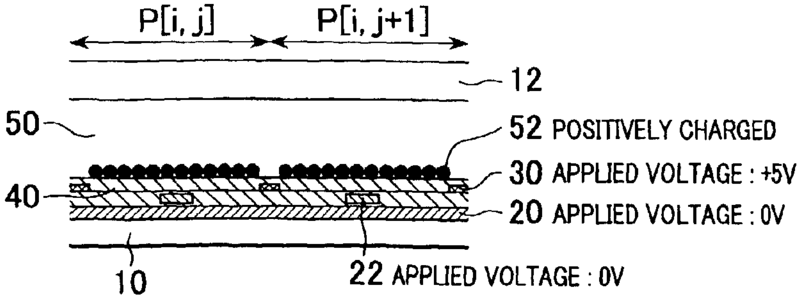
Figure 2B:
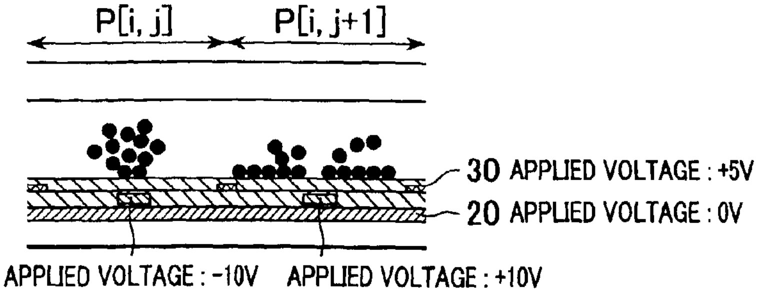
Figure 2C:
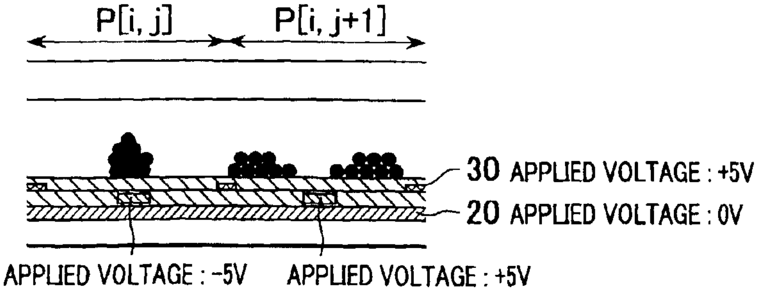
Figure 2D:
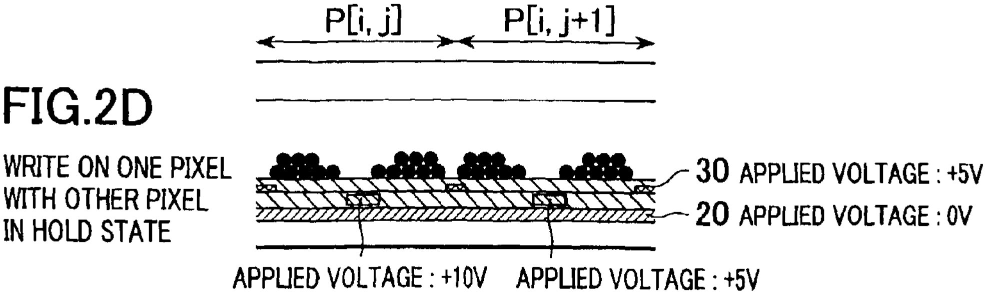

Referring to FIGS. 2A–2D, the application method of voltage to each electrode is discussed below. Pixels P [i,j] and P[i,j+1] are shown in cross section here. FIG. 2A shows the pixels reset to black in the initial state thereof. FIG. 2B shows the pixel P[i,j] written in white and the pixel P[i,j+1] written in black. FIG. 2C shows the pixels remaining in the state written in FIG. 2B. FIG. 2D shows the pixel P[i,j] written in black and the pixel P[i,j+1] remaining in a hold state. As shown, the potentials of the electrodes and the movement of the charged particles 52 are diagrammatically illustrated in each write operation.

As shown in FIG. 2A, all charged particles 52 are disposed above the first display electrode 20 and the second display electrode 22 in the initial state. The present invention is not limited to this initial state in the write operation. Charged particles 52 may be disposed above the guard electrode 30. A potential having the polarity opposite from that of the charged particles 52 may be applied to the guard electrode 30.

Referring to FIG. 2B, the electrodes are biased so that charged particles 52 gather on the second display electrode 22 only in the pixel P[i,j] and so that charged particles 52 gather on the first display electrode 20 only in the pixel P[i,j+1]. The guard electrode 30 is biased so that a write voltage to a pixel does not interfere with a write operation to an adjacent pixel. Specifically, the guard electrode 30 is biased at a predetermined voltage to create a potential gradient. The potential gradient controls the effect of the electric field of adjacent pixels pixel P[i,j] and the pixel P[i,j+1] by allowing the electric field generated by the guard electrode 30 to act on the electric field generated by the adjacent pixels.

When the charged particles 52 are positively charged, the first display electrode 20 in the pixel P[i,j] is supplied with a voltage higher than that of the second display electrode 22, and the first display electrode 20 in the pixel P[i,j+1] is supplied with a voltage lower than that of the second display electrode 22. The guard electrode 30 must be supplied with a voltage higher than that of the first display electrode 20 adjacent to the guard electrode 30.

A write operation is smoothly carried out as shown in FIG. 2B by supplying the first display electrodes 20 of the two pixels with a reference potential [0 V] as a common potential, the second display electrode 22 in the pixel P[i,j] with −10 V, the second display electrode 22 in the pixel P[i,j+1] with +10 V, and the guard electrode 30 with +5 V.

In a preferred embodiment, the voltage difference between the guard electrode 30 and the first display electrode 20 takes an appropriate value to control interference between the adjacent pixels and to present a display without degrading image quality. An appropriate voltage difference between the guard electrode 30 and the first display electrode 20 is preferably set for all pixels. To this end, the first display electrode 20 is set to a common potential and the guard electrode 30 is set to another common potential.

FIG. 2C shows the hold state and voltages applied to the electrodes subsequent to the write operation shown in FIG. 2B. The second display electrode 22 may be biased at zero V as in FIG. 1. For the reason discussed later, the second display electrode 22 in the pixel P[i,j] is supplied with −5 V, and the second display electrode 22 in the pixel P[i,j+1] is supplied with +5 V.

The pixel P[i,j] only is refreshed in the write operation shown in FIG. 2D. A potential gradient is set up so that charged particles 52 move from the second display electrode 22 to the first display electrode 20 in the pixel P[i,j]. It is necessary to hold charged particles 52 disposed in the first display electrode 20 in the pixel P[i,j+1]. To hold the charged particles 52, the charged particles 52 must be controlled in such a manner that the distribution of the already disposed charged particles 52 remains unchanged with image quality assured. The second display electrode 22 is supplied with a voltage having the same polarity as that of the guard electrode 30 with respect to the first display electrode 20. A force driving the charged particles 52 on the first display electrode 20 toward the guard electrode 30 cancels the force by the guard electrode 30, thereby holding the display state.

When the display state to hold is a state that charged particles 52 remain on the second display electrode 22, the above setting is not necessary. Conversely, the second display electrode 22 is preferably supplied with a voltage lower than that of the first display electrode 20 so that no charged particles 52 drift from the second display electrode 22.

The second display electrode 22 in the pixel in the hold state is biased as below. When the positively charged particles 52 are placed above the first display electrode 20 which is grounded, the second display electrode 22 in the pixel P[i,j] is supplied with +10 V, the second display electrode 22 in the pixel P[i,j+1] is supplied with +5 V, and the guard electrode 30 is supplied with +5 V. A write operation is thus smoothly carried out as shown in FIG. 2D.

The voltage applied to the guard electrode 30 may be changed with time. For example, the application of voltage to the guard electrode 30 may be synchronized with the application of voltage to the display electrodes.

Alternatively, the voltage may continuously be applied to the guard electrode 30 during a display refresh period. However, if a voltage of the same polarity is continuously supplied, ions contained in the dispersing fluid 50 accumulate on the guard electrode 30, possibly canceling the voltage applied to the guard electrode 30. To remedy this problem, a voltage opposite in polarity to the charged particles 52 is preferably applied to the guard electrode 30 to remove the accumulated ions as necessary.

Referring to FIG. 3, voltages supplied to the electrodes are listed. In each operation listed in FIG. 3, the inter-pixel interference is reduced by applying +5 V to the guard electrode 30. The electrophoretic display device of the present invention reduces or prevents the inter-pixel interference while performing a write operation.

In the above discussion, the charged particles 52 are placed above the first display electrode 20 and the second display electrode 22 in the initial state. In the present invention, it is not a requirement that the setting of the electrodes be at the initial state prior to a write operation. A continuous write operation is also perfectly acceptable.

The electrophoretic display device of the present invention controlling inter-pixel interference presents a tonal gradation display by electrical controlling. Feeding an appropriate voltage to the guard electrode 30 assures electrical balance on the entire border between the pixels. The electrical controlling includes control of the duration of time and timing of voltage application, and the magnitude and polarity of the applied voltage. Since the voltage applied to one pixel does not affect another pixel adjacent thereto, a desired voltage can be applied to each pixel.

The embodiments of the present invention are discussed below.

First Embodiment

The display device of the present invention is discussed with reference to FIGS. 1A–2D. The electrophoretic display device of the present invention illustrated in FIGS. 1A and 1B includes a first substrate 10 and a second substrate 12 with a predetermined gap permitted therebetween in the Z direction, first display electrodes 20 and second display electrodes 22 for supplying the first substrate 10 with different voltages, a dispersing fluid 50 sandwiched between the two substrates 10 and 12, and a plurality of charged color particles 52 dispersed in the dispersing fluid 50. Silicone oil is used for the dispersing fluid 50 and a mixture of polystyrene and carbon and having a diameter of 1 to 2 $\mu$m is used for the charged particles 52.

The first display electrode 20 is produced by patterning an ITO (Indium Tin Oxide) film having a thickness of 100 nm arranged on a PET layer having a thickness of 300 $\mu$m. An ITO film having a thickness of 100 nm is disposed for the second display electrode 22 on the first display electrode 20 with an interlayer insulator interposed therebetween. Each pixel has a square shape sized to be 120 $\mu$m by 120 $\mu$m. The second display electrode 22 deposited on the first display electrode 20 fully extending within each pixel has a dot-like configuration having a diameter of 30 $\mu$m and centered on each pixel. A guard electrode 30 arranged on the first display electrode 20 with a second interlayer insulator interposed therebetween is formed of an ITO line having a width of 10 $\mu$m and surrounding each square pixel. An insulating material as an insulator 40 is deposited on the guard electrode 30 so that the charged particles 52 are not directly put into contact with the guard electrode 30. The interlayer insulators and the insulator 40 are fabricated of a transparent acrylic based resin film having a thickness of about 2 $\mu$m. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT (Thin-Film Transistor) element (not shown) so that the second display electrodes 22 are individually controlled.

A method of driving the electrophoretic display device of the present invention is discussed below with reference to FIGS. 2A–2D. For convenience of explanation, the electrophoretic display device is of a reflective type having a reflective layer (not shown) arranged on the first substrate 10. The charged particles 52 dispersed in the dispersing fluid 50 are now positively charged. The guard electrode 30 is continuously supplied with +5 V throughout a period from the state illustrated in FIG. 2A to the state illustrated in FIG. 2D.

The charged particles 52 are placed on the entire surface within the display area of the device in a reset state prior to a write operation as shown in FIG. 2A.

The first display electrode 20 and the second display electrode 22 are supplied with zero V (grounded). The positively charged particles 52 are uniformly placed within the display area in accordance with a uniform distribution of electric field generated in the display area. Since the charged particles 52, namely, a mixture containing carbon, is black, the display looks black if the user views from outside the second substrate 12.

Referring to FIGS. 2B and 2C, a write operation is performed on the pixel P[i,j] and the pixel P[i,j+1] so that the charged particles 52 are collected on the second display electrode 22 in the pixel P[i,j] and so that the charged particles 52 are placed on the first display electrode 20 in the pixel P[i,j+1] adjacent to the pixel P[i,j]. A write operation is concurrently performed on the two pixels. With the first display electrode 20 continuously supplied with zero V, the second display electrode 22 in the pixel P[i,j] is supplied with −10 V and the second display electrode 22 in the pixel P[i,j+1] is supplied with +10 V. The charged particles 52 electrophoretically move in the dispersing fluid 50 and it takes about 50 ms to reach the state illustrated in FIG. 2C. To hold the charged particles 52 in the state illustrated in FIG. 2C, the second display electrode 22 in the pixel P[i,j] is supplied with −5 V and the second display electrode 22 in the pixel P[i,j+1] is supplied with +5 V.

Referring to FIG. 2D, a write operation is performed on the pixel P[i,j] only with the display state held in the pixel P[i,j+1]. The charged particles 52 are moved to the first display electrode 20 in the pixel P[i,j]. Then, with the first display electrode 20 supplied with zero V, the second display electrode 22 in the pixel P[i,j] is supplied with +10 V. The charged particles 52 collected on the second display electrode 22 in the pixel P[i,j] are moved and it takes charged particles 52 about 50 ms to move to the first display electrode 20. The second display electrode 22 in the pixel P[i,j+1] is supplied with zero V. The charged particles 52 placed on the first display electrode 20 in the pixel P[i,j+1] continuously remains in that state.

The guard electrode 30 is continuously supplied with +5 V throughout the period from the state shown in FIG. 2A to the state shown in FIG. 2D. The voltage fed to the guard electrode 30 is higher than voltages fed to the first display electrode 20 and second display electrode 22 adjacent to the guard electrode 30. When a write operation is performed as shown in FIG. 2C, any electric field mutually affecting the adjacent pixels is not generated in the insulating dispersing fluid 50 in the pixel P[i,j] and the pixel P[i,j+1]. The inter-pixel interference between the pixel P[i,j] and the pixel P[i,j+1] is thus controlled.

Second Embodiment

Figure 4B:
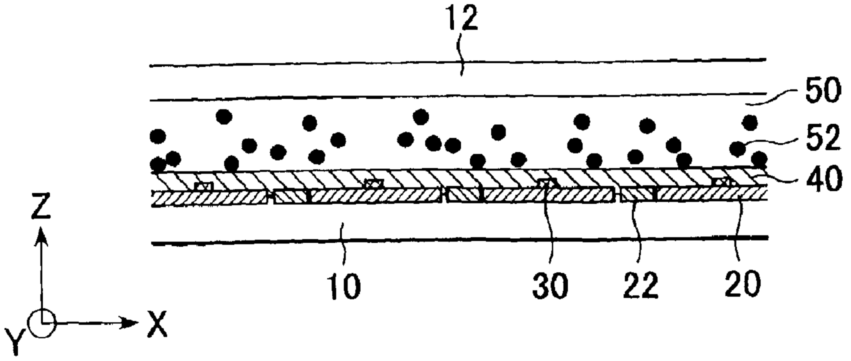

A display device of the present invention is discussed below with reference to FIGS. 4A–5D. FIG. 4A is a top view of the electrophoretic display device of a second embodiment, and FIG. 4B is a sectional view taken along line A–A' in FIG. 4A. The electrophoretic display device of the present invention includes a first substrate 10 and a second substrate 12 with a predetermined gap permitted therebetween in the Z direction, first display electrodes 20 and second display electrodes 22 for supplying the first substrate 10 with different voltages, a dispersing fluid 50 sandwiched between the two substrates 10 and 12, and a plurality of charged color particles 52 dispersed in the dispersing fluid 50. Silicone oil is used for the dispersing fluid 50 and a mixture of polystyrene and carbon and having a diameter of 1 to 2 μm is used for the charged particles 52.

The first display electrode 20 is produced by patterning an ITO film having a thickness of 100 nm arranged on a PET layer having a thickness of 300 μm. Each pixel has a square shape sized to be 120 μm by 120 μm. Striped first display electrodes 20, one arranged in each pixel, and having a width of 75 μm, are arranged with a pitch of 120 μm. Striped second display electrodes 22, each alternately arranged with the first display electrode 20, and fabricated of Al, and having a width of 30 μm, are arranged with a pitch of 120 μm. The guard electrode 30 arranged above the first display electrode 20 and having a width of 10 μm surrounds each pixel. The guard electrodes 30, fabricated of ITO, are arranged with a pitch of 120 μm in the X direction and Y direction. Insulators 40 are respectively interposed between the first and second display electrodes 20 and 22, and the guard electrode 30, and on the guard electrode 30. The interlayer insulator and the insulator 40 on the guard electrode 30 are fabricated of an acrylic resin film having a thickness of 2 μm. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 in the respective pixels arranged in matrix configuration are individually controlled.

A method of driving the electrophoretic display device of the present invention is discussed below with reference to FIGS. 5A–5D. For convenience of explanation, the electrophoretic display device is of a reflective type having a reflective layer (not shown) arranged on the first substrate 10. The charged particles 52 dispersed in the dispersing fluid 50 are now positively charged. The guard electrode 30 is continuously supplied with +15 V throughout a period from the state illustrated in FIG. 5A to the state illustrated in FIG. 5D.

Figure 5A:
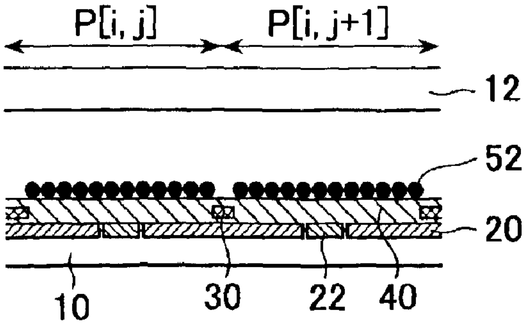
FIGS. 5A–5D show a method of driving the display device of the second embodiment of the present invention.

The charged particles 52 are placed on the entire surface of the within the display area of the device in a reset state prior to a write operation as shown in FIG. 5A.

The first display electrode 20 and the second display electrode 22 are supplied with zero V (grounded). The positively charged particles 52 are uniformly placed within the display area in accordance with a uniform distribution of electric field generated in the display area. Since the charged particles 52, namely, a mixture containing carbon, is black, the display looks black if the use views from outside the second substrate 12.

Figure 5B:
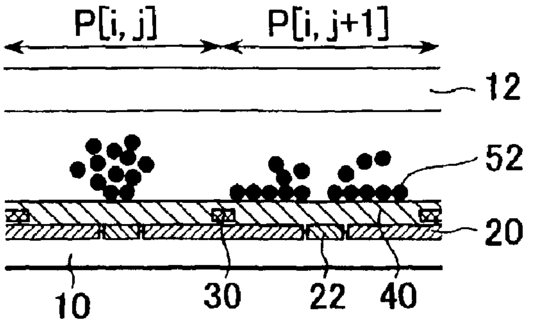
Figure 5C:
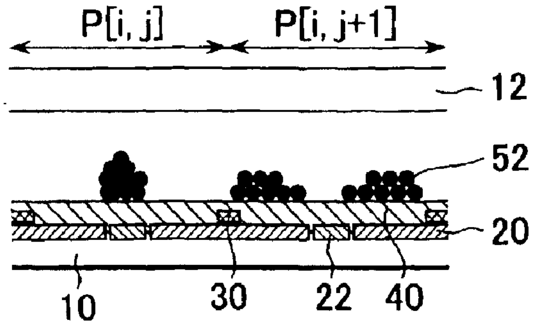
Figure 5D:
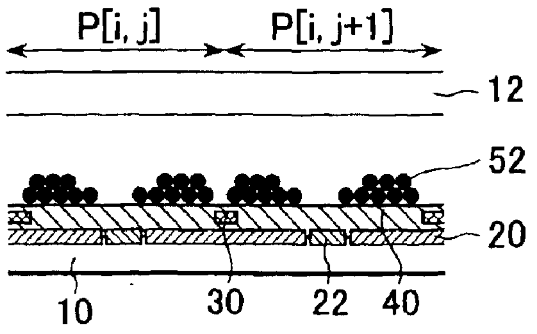

Referring to FIGS. 5B and 5C, a write operation is performed on the pixel P[i,j] and the pixel P[i,j+1] so that the charged particles 52 are collected on the second display electrode 22 in the pixel P[i,j] and so that the charged particles 52 are collected on the first display electrode 20 in the pixel P[i,j+1] adjacent to the pixel P[i,j]. A write operation is concurrently performed on the two pixels. With the first display electrode 20 supplied with zero V, the second display electrode 22 in the pixel P[i,j] is supplied with −10 V and the second display electrode 22 in the pixel P[i,j+1] is supplied with +10 V. The charged particles 52 electrophoretically move, and it takes about 50 ms to reach the state illustrated in FIG. 5C. To hold the charged particles 52 in the state illustrated in FIG. 5C, the second display electrode 22 in the pixel P[i,j] is supplied with −5 V, and the second display electrode 22 in the pixel P[i,j+1] is supplied with +5 V. A write operation is performed on the pixel P[i,j] only with the display state held in the pixel P[i,j+1] as shown in FIG. 5D. The charged particles 52 are moved to the first display electrode 20 in the pixel P[i,j]. With the first display electrode 20 supplied with zero V, the second display electrode 22 in the pixel P[i,j] is supplied with −10 V. The charged particles 52 collected on the second display electrode 22 in the pixel P[i,j] move to the first display electrode 20. It takes about 30 ms. The second display electrode 22 in the pixel P[i,j+1] is supplied with zero V, and the charged particles 52 placed on the first display electrode 20 in the pixel P[i,j+1] remains in that state.

The guard electrode 30 is continuously supplied with +15 V throughout the period from the state shown in FIG. 5A to the state shown in FIG. 5D. The voltage fed to the guard electrode 30 is higher than voltages fed to the first display electrode 20 and second display electrode 22 adjacent to the guard electrode 30. When a write operation is performed as shown as in FIG. 5C, an electric field mutually affecting the adjacent pixels is not generated in the insulating dispersing fluid 50 in the pixel P[i,j] and the pixel P[i,j+1]. The inter-pixel interference between the pixel P[i,j] and the pixel P[i,j+1] is thus controlled.

In the electrophoretic display device having a plurality of pixels arranged in a matrix configuration, the inter-pixel interference in the direction of rows (the X direction) has been discussed. The inter-pixel interference in the direction of columns (the Y direction) is also considered. Specifically, a portion of the guard electrode 30 extending in the Y direction is adjacent to the first display electrode 20 only and another portion of the guard electrode 30 extending in the X direction is adjacent to both the first display electrode 20 and the guard electrode 30. The guard electrode 30 is supplied with +15 V, which is higher than the voltage of the second display electrode 22 to which +10 V is fed.

Third Embodiment

A display device of the present invention will now be discussed with reference to FIG. 6. The electrophoretic display device of the present invention shown in FIG. 6 includes a first substrate 10 and a second substrate 12 with a predetermined gap permitted therebetween in the Z direction, first display electrodes 20 and second display electrodes 22 for supplying the first substrate 10 with different voltages, a guard electrode 30 in the border between pixels, and an electric shield electrode 32, disposed between the guard electrode 30 and one of the substrates bearing the guard electrode 30, for localizing the electric field generated by the guard electrode 30 to within a predetermined area. The electrophoretic display device further includes a dispersing fluid 50 sandwiched between the two substrates 10 and 12, and a plurality of charged color particles 52 dispersed in the dispersing fluid 50. Silicone oil is used for the dispersing fluid 50 and a mixture of polystyrene and carbon and having a diameter of 1 to 2 $\mu$m is used for the charged particles 52. The first display electrode 20 is produced by patterning an ITO film having a thickness of 100 nm arranged on a PET layer having a thickness of 300 $\mu$m. Each pixel has a square shape sized to be 120 $\mu$m by 120 $\mu$m. Striped first display electrodes 20, one in each pixel, and having a width of 70 $\mu$m, are arranged with a pitch of 120 $\mu$m. Striped second display electrodes 22, each alternately arranged with the first display electrode 20, fabricated of Al, and having a thickness of 100 nm and a width of 30 $\mu$m, are arranged with a pitch of 120 $\mu$m. The electric shield electrode 32 and the guard electrode 30 arranged on the first display electrode 20 with interlayer insulators interposed therebetween extend along the border between the pixels. The electric shield electrode 32 has a width of 15 $\mu$m, and the guard electrode 30 has a width of 10 $\mu$m. Each of the electric shield electrode 32 and the guard electrode 30 is fabricated of ITO and arranged with a pitch of 120 $\mu$m in the X direction and the Y direction. The guard electrode 30 is covered with an insulator so that no charged particles 52 are in direct contact therewith. The interlayer insulators and the insulator 40 arranged on the guard electrode 30 are fabricated of a transparent acrylic resin film having a thickness of 2 $\mu$m. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

A method of driving the electrophoretic display device of the present invention is discussed. The display device presents an image in a manner similar to that of the first embodiment. The third embodiment is different from the first embodiment in that a voltage is applied to the electric shield electrode 32 to localize the electric field generated by the guard electrode 30 to within an area close to the electric shield electrode 32. The electric shield electrode 32 is supplied with zero V when the first display electrode 20 is supplied with zero V, the second display electrode 22 is supplied with +10 V or −10 V, and the guard electrode 30 is supplied with +15 V. The electric field generated by the electric shield electrode 32 and the electric field generated within the display area including the first display electrode 20 and the second display electrode 22 are converged in the vicinity of the guard electrode 30. In this way, the charged particles 52 present in the vicinity of the guard electrode 30 are smoothly controlled by means of the electric field generated by the first display electrode 20 and the second display electrode 22.

Fourth Embodiment

A display device of a fourth embodiment of the present invention will now be discussed with reference to FIG. 7. The electrophoretic display device of the fourth embodiment of the present invention shown in FIG. 7 includes a first substrate 10 and a second substrate 12 with a predetermined gap permitted therebetween in the Z direction, first display electrodes 20 and second display electrodes 22 for providing the first substrate 10 with different voltages, a guard electrode 30 in the border between pixels, and a rib structure 34 on the guard electrode 30. The electrophoretic display device further includes a dispersing fluid 50 sandwiched between the two substrates 10 and 12, and a plurality of charged color particles 52 dispersed in the dispersing fluid 50. Silicone oil is used for the dispersing fluid 50 and a mixture of polystyrene and carbon and having a diameter of 1 to 2 $\mu$m is used for the charged particles 52.

The first display electrode 20 is produced by patterning an ITO film having a thickness of 100 nm arranged on a PET layer having a thickness of 300 $\mu$m. Each pixel has a square shape sized to be 120 $\mu$m by 120 $\mu$m. Striped first display electrodes 20, one arranged in each pixel and having a width of 70 $\mu$m, are arranged with a pitch of 120 $\mu$m. Striped second display electrodes 22, each alternately arranged with the first display electrode 20, fabricated of Al, and having a thickness of 100 nm and a width of 30 $\mu$m, are arranged with a pitch of 120 $\mu$m. The guard electrode 30 arranged on the first display electrode 20 with interlayer insulator interposed therebetween extends along the border between the pixels. The guard electrode 30 has a width of 10 $\mu$m. The guard electrode 30 is fabricated of ITO and arranged with a pitch of 120 $\mu$m in the X direction and the Y direction. The guard electrode 30 is covered with an insulator so that no charged particles 52 are in direct contact therewith. The interlayer insulator and the insulator 40 on the guard electrode 30 are fabricated of a transparent acrylic resin film having a thickness of 2 $\mu$m. The rib structure 34 having a width of 10 $\mu$m and a height of 5 $\mu$m and fabricated of a photosensitive acrylic resin is arranged on the guard electrode 30. The photosensitive acrylic resin has a dielectric constant larger than that of the dispersing fluid 50. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

A method of driving the electrophoretic display device of the present invention is discussed. The display device of the fourth embodiment presents an image in a manner similar to that of the first embodiment. The fourth embodiment is different from the first embodiment in that the rib structure 34 is arranged on the top of the guard electrode 30. This arrangement has proved effective to physically prevent particles from drifting into an adjacent pixel. In other words, the rib structure 34 works as a barrier. When the gap between the first substrate 10 and the second substrate 12 is 20 $\mu$m, the first display electrode 20 is supplied with zero V, the second display electrode 22 is supplied with +10 V or −10 V, and the guard electrode 30 is supplied with +15 V. The electric field generated by the guard electrode 30 controls electrical inter-pixel interference. The rib structure 34 physically controls the flow of the dispersing fluid 50 caused by the movement of the charged particles 52 and affecting the charged particles 52 which are electrophoretically moved. The flow of the dispersing fluid 50 due to the movement of the charged particles 52 significantly varies depending on the gap between the first substrate 10 and the second substrate 12, the magnitude and period of the voltage applied to the display electrodes, and the material in contact with the dispersing fluid 50. When convection occurs because of these causes, the use of the rib structure 34 is effective.

Fifth Embodiment

A display device of a fifth embodiment of the present invention will now be discussed with reference to FIG. 8. The electrophoretic display device of the present invention shown in FIG. 8 includes a first substrate 10 and a second substrate 12 with a predetermined gap permitted therebetween in the Z direction, first display electrodes 20 and second display electrodes 22 for supplying the first substrate 10 with different voltages, a guard electrode 30 in the border between pixels, and a rib structure 34 on the second substrate 12 at a location facing the guard electrode 30. The electrophoretic display device further includes a dispersing fluid 50 sandwiched between the two substrates 10 and 12, and a plurality of charged color particles 52 dispersed in the dispersing fluid 50.

Silicone oil is used for the dispersing fluid 50 and a mixture of polystyrene and carbon and having a diameter of 1 to 2 μm is used for the charged particles 52. The first display electrode 20 is produced by patterning an ITO film having a thickness of 100 nm arranged on a PET layer having a thickness of 300 μm. Each pixel has a square shape sized to be 120 μm by 120 μm. Striped first display electrodes 20, one arranged in each pixel and having a width of 70 μm, are arranged with a pitch of 120 μm. Striped second display electrodes 22, each alternately arranged with the first display electrode 20, fabricated of Al, and having a thickness of 100 nm and a width of 30 μm, are arranged with a pitch of 120 μm. The guard electrode 30 arranged on the first display electrode 20 with interlayer insulator interposed therebetween extend along the border between the pixels. The guard electrode 30 has a width of 10 μm. The guard electrodes 30 are fabricated of ITO and arranged with a pitch of 120 μm in the X direction and the Y direction. The guard electrode 30 is covered with an insulator so that no charged particles 52 are in direct contact therewith. Interlayer insulator and an insulator 40 on the guard electrode 30 are fabricated of a transparent acrylic resin film having a thickness of 2 μm. The rib structure 34 having a width of 15 μm and a height of 20 μm and fabricated of a photosensitive acrylic resin through a molding process is arranged on the second substrate 12 at a location facing the guard electrode 30. The photosensitive acrylic resin has a dielectric constant close to that of the dispersing fluid 50. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

A method of driving the electrophoretic display device of the present invention is discussed. The display device of the fifth embodiment presents an image in a manner similar to that of the first embodiment. The fifth embodiment is different from the first embodiment in that the rib structure 34 is arranged on the second substrate 12 at a location facing the guard electrode 30. This arrangement has proved effective to physically prevent particles from drifting one pixel into an adjacent pixel. This effect is particularly pronounced when the gap between the first substrate 10 and the second substrate 12 is wide. When the gap between the first substrate 10 and the second substrate 12 is wide, the inter-pixel interference becomes difficult to control with the distance from the guard electrode 30 only by the electric field of the guard electrode 30. The higher voltage applied to the guard electrode 30, the more effectively the inter-pixel interference is reduced. However, it is not preferred that a high voltage is applied to the guard electrode 30. With a high voltage applied to the guard electrode 30, the placing of the charged particles 52 in the vicinity of the guard electrode 30 becomes difficult under the repellant force from the guard electrode 30 to which a voltage of the same polarity as that of the charged particles 52 is applied. This leads to a drop in the contrast of the display device. The application of a higher voltage itself consumes more power. Therefore, the application of a higher voltage to the guard electrode 30 is not preferable as a means to control the inter-pixel interference. The rib structure arranged on the second display electrode 22 facing the guard electrode 30 is thus an effective remedy. When the gap between the first substrate 10 and the second display electrode 22 is 40 μm with the first display electrode 20 supplied with zero V, the second display electrode 22 supplied with −10 V or +10 V, and the guard electrode 30 supplied with +15 V, the electric field generated by the guard electrode 30 controls the inter-pixel interference in the vicinity of the guard electrode 30, and the rib structure 34 arranged on the second substrate 12 physically controls the inter-pixel interference due to charged particles 52 spaced from the guard electrode 30.

Sixth Embodiment

Figure 9:
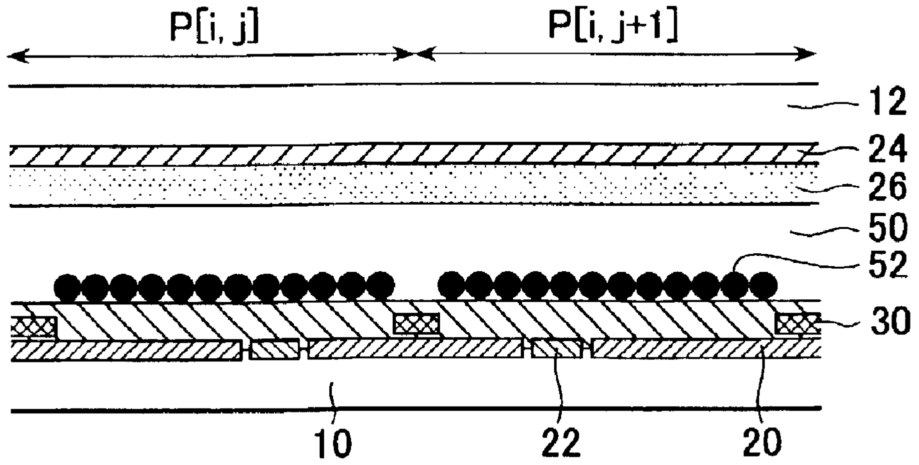
FIG. 9 shows the display device having a third electrode in accordance with a sixth embodiment of the present invention.

A display device of a sixth embodiment of the present invention will now be discussed with reference to FIG. 9. The electrophoretic display device of the present invention shown in FIG. 9 includes a first substrate 10 and a second substrate 12 with a predetermined gap permitted therebetween in the Z direction, first display electrodes 20 and second display electrodes 22 for supplying the first substrate 10 with different voltages, a dispersing fluid 50 sandwiched between the two substrates 10 and 12, and a plurality of charged color particles 52 dispersed in the dispersing fluid 50. The electrophoretic display device further includes a third display electrode 24 and a dielectric layer 26 on the third display electrode 24 on the second substrate 12. The dielectric layer 26 is arranged to be in contact with the dispersing fluid 50. Silicone oil is used for the dispersing fluid 50 and a mixture of polystyrene and carbon and having a diameter of 1 to 2 μm is used for the charged particles 52. The first display electrode 20 and the second display electrode 22 are produced by patterning an ITO film having a thickness of 100 nm arranged on a PET layer having a thickness of 300 μm. Each pixel has a square shape sized to be 120 μm by 120 μm. The first display electrode 20 is arranged in the periphery of each pixel and the second display electrode 22 has a dot-like configuration having a diameter of 30 μm and centered on each pixel. A guard electrode 30 arranged on the first display electrode 20 with a second interlayer insulator interposed therebetween is formed of an ITO line having a width of 10 μm and surrounding each square pixel. The guard electrode 30 is arranged with a pitch of 120 μm in the X direction and the Y direction. An insulating material as an insulator 40 is deposited on the guard electrode 30. The interlayer insulators and the insulator 40 are fabricated of a transparent acrylic based resin film having a thickness of about 2 μm. An ITO film is fully deposited on the second substrate 12 and the third display electrode 24 is covered with a teflon resin film as a dielectric layer so that the charged particles 52 may not be in direct contact with the third display electrode 24. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

A method of driving the electrophoretic display device of the sixth embodiment is discussed below. The display device of the sixth embodiment presents an image in a manner similar to that of the first embodiment. The sixth embodiment is different from the first embodiment in that the third display electrode 24 arranged on the second substrate 12 serves as a common electrode and is continuously supplied with zero V during a write operation. With the third display electrode 24, the effect of the guard electrode 30 is enhanced.

Figures 2, 14B:
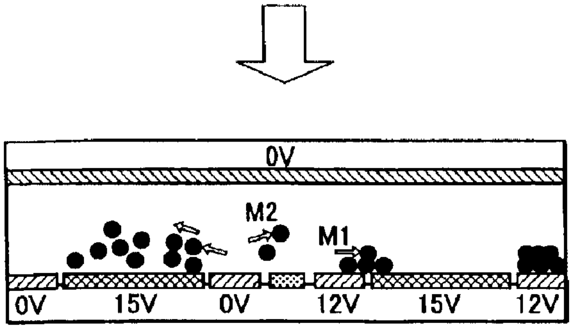

The difference between an arrangement similar to the first embodiment having no third display electrode 24 as shown in FIG. 10A-1 and the sixth embodiment having the third display electrode 24 as shown in FIG. 10B-1 is discussed below. FIG. 10A-1 shows a construction having no electrodes on the counter substrate as in the first embodiment. FIG. 10B-1 is a sectional view of the electrophoretic display device of the sixth embodiment. A graph presented below each sectional view is a plot of the potential distribution along a dotted line A–A' determined through calculation with the same write voltage applied to the first display electrode 20 and the second display electrode 22. The first display electrode 20 is supplied with zero V, the second display electrode 22 in the pixel P[i,j] is supplied with −10 V, and the second display electrode 22 in the pixel P[i,j+1] is supplied with +10 V. Furthermore, the guard electrode 30 is supplied with +5 V, and the third display electrode 24 included in the sixth embodiment only as shown in FIG. 10B-1 is supplied with zero V. The charged particles 52, if positively charged in the dispersing fluid 50, gather in a trough portion of the potential curve, and are subject to a repellant force on a peak portion of the potential curve. When the voltages are applied to the electrodes as described above, the charged particles 52 move in both arrangements in the sectional views in FIGS. 10A-1 and 10B-1. If the number of charged particles 52 is increased in the dispersing fluid 50, the arrangement of the sixth embodiment shown in FIG. 10B-1 presents an image more reliably. This is because the depth of a trough in the potential curve shown in FIG. 10A-2 is shallower than a tough in the potential curve shown in FIG. 10B-2. Specifically, with the third display electrode 24, a reliable display is presented when the density of the charged particles 52 is high.

Seventh Embodiment

Figure 11:
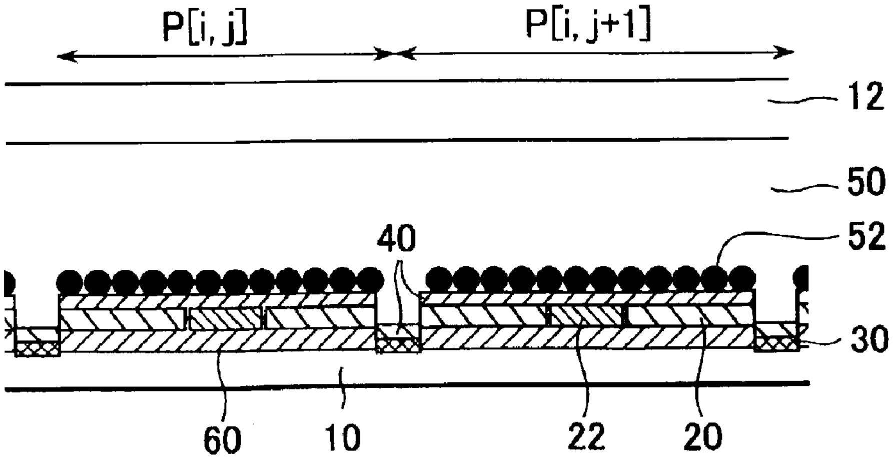
FIG. 11 shows the display device of a seventh embodiment of the present invention, wherein a guard electrode is placed in a level lower than a display electrode.

FIG. 11 shows the display device of a seventh embodiment of the present invention. The electrophoretic display device of the present invention shown in FIG. 11 includes a first substrate 10 and a second substrate 12 with a predetermined gap permitted therebetween in the Z direction, first display electrodes 20 and second display electrodes 22 for supplying the first substrate 10 with different voltages, a dispersing fluid 50 sandwiched between the two substrates 10 and 12, and a plurality of charged color particles 52 dispersed in the dispersing fluid 50. The electrophoretic display device further includes a guard electrode 30 on the bottom surface of a channel arranged in the border between the pixels. The guard electrode 30 is lower in level than the first display electrode 20 and the guard electrode 30, each adjacent to the guard electrode 30. Silicone oil is used for the dispersing fluid 50 and a mixture of polystyrene and carbon and having a diameter of 1 to 2 μm is used for the charged particles 52.

An insulating structure 60 equal in size to a square pixel of 120 μm by 120 μm and having a thickness of 5 μm is arranged on a 300 μm thick PET substrate as the first substrate 10. First display electrodes 20 and second display electrodes 22, each having a thickness of 100 nm, are formed on the structure 60. The striped first display electrodes 20 in respective pixels have a width of 70 μm and are arranged with a pitch of 120 μm. The first display electrode 20 is produced by patterning an ITO film. The striped second display electrodes 22, each alternately arranged with the first display electrodes 20, are fabricated of Al, and have a width of 30 μm. The second display electrodes 22 are arranged with a pitch of 120 μm. The guard electrodes 30, fabricated of Ti, is arranged on the bottom surface of a channel surrounding each of the structures 60 arranged in a matrix, has a line width of 10 μm and a thickness of 100 nm, and extends with a pitch of 120 μm in the X and Y directions. An insulator 40, fabricated of a transparent acrylic resin film having a thickness of 2 μm, is deposited on the first display electrode 20, the second display electrode 22, and the guard electrode 30. The photolithographic process and the etching process are employed to pattern each electrode.

In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

A method of driving the electrophoretic display device of the seventh embodiment is discussed below. The display device of the seventh embodiment presents an image in a manner similar to that of the first embodiment. The seventh embodiment is different from the first embodiment in that the electric field generated by the guard electrode 30 is localized within the channel by arranging a step between the guard electrode 30 and the first and second display electrodes 20 and 22. The electric field generated between the guard electrode 30 and the second display electrode 22 is concentrated in the vicinity of the guard electrode 30 if the first display electrode 20 is supplied with zero V, the second display electrode 22 is supplied with +10 V or −10 V, and the guard electrode 30 is supplied with +15 V. The charged particles 52 present in the vicinity of the guard electrode 30 are smoothly controlled by the electric field generated by the first display electrode 20 and the second display electrode 22.

Eighth Embodiment

Figure 13:
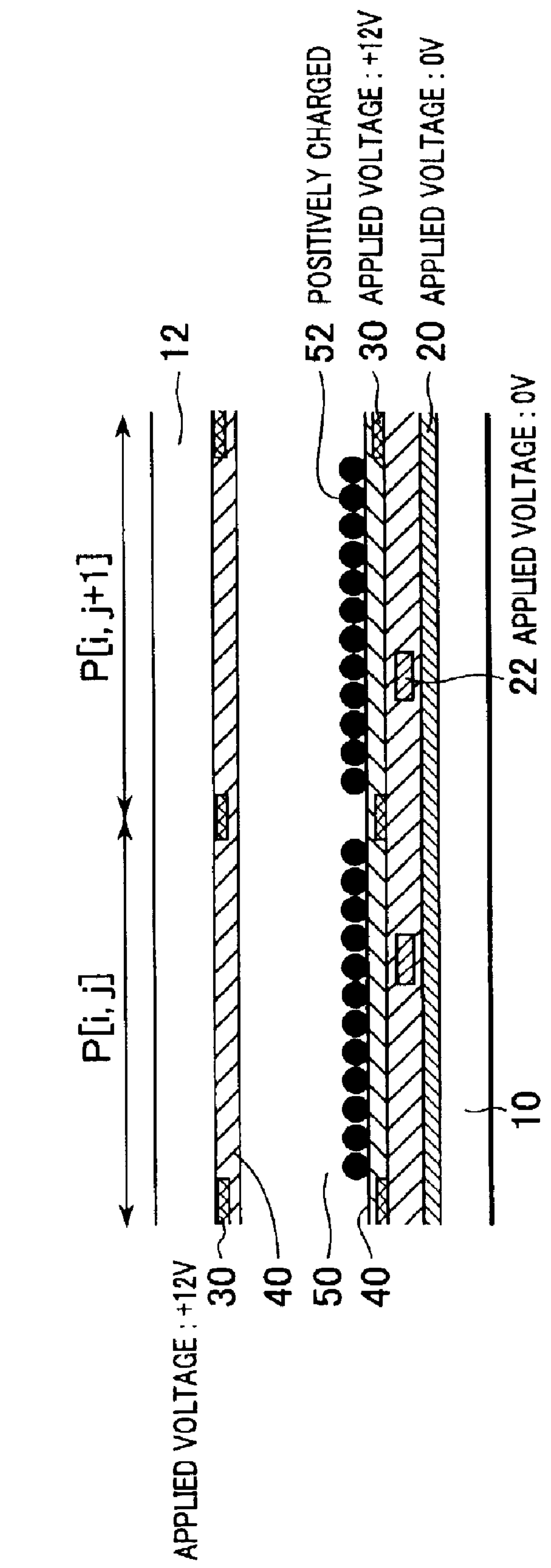
FIG. 13 shows the display device having guard electrodes arranged on each of top and bottom substrates in accordance with an eighth embodiment of the present invention.

FIG. 13 shows the display device of an eighth embodiment of the present invention. The electrophoretic display device of the present invention shown in FIG. 13 includes a first substrate 10 and a second substrate 12 with a predetermined gap permitted therebetween in the Z direction, first display electrodes 20 and second display electrodes 22 for supplying the first substrate 10 with different voltages, a dispersing fluid 50 sandwiched between the two substrates 10 and 12, and a plurality of charged color particles 52 dispersed in the dispersing fluid 50. The electrophoretic display device further includes a guard electrode 30 on the border between pixels on the first substrate 10 and another guard electrode 30 on the second substrate 12 at a location facing the first guard electrode 30. The second guard electrode 30 is also controllable independently of the first guard electrode 30. Silicone oil is used for the dispersing fluid 50 and a mixture of polystyrene and carbon and having a diameter of 1 to 2 μm is used for the charged particles 52.

The first guard electrode 30 and the second guard electrode 30 are covered with insulator 40 so that the charged particles 52 may not be in direct contact with the first and second guard electrodes 30 in the border. The first display electrode 20 is produced by patterning an ITO film having a thickness of 100 nm arranged on a PET layer having a thickness of 300 μm. Each pixel has a square shape sized to be 120 μm by 120 μm. The second display electrode 22 fabricated of Al and having a thickness of 100 nm is arranged on the first display electrode 20 fully extending within each pixel with an interlayer insulator interposed therebetween. The second display electrode 22 has a dot-like configuration having a diameter of 30 μm and centered on each pixel. The first guard electrode 30 formed on the first display electrode 20 with a second insulator interposed therebetween and the second guard electrode 30 on the second substrate 12 facing the first guard electrode 30 are fabricated of ITO in the square periphery, each guard electrode having a width 10 μm. The interlayer insulators and the insulator 40 on the guard electrode 30 are fabricated of a transparent acrylic based resin film having a thickness of about 2 μm. The photolithographic process and the etching process are employed to pattern each electrode. In case of a reflective type display device, a reflective layer (not shown) is preferably arranged on the first substrate 10 if the second substrate 12 serves as a face plate. The second display electrode 22 of each pixel is connected to a switching TFT element (not shown) so that the second display electrodes 22 are individually controlled.

In accordance with the display device and the method of driving the display device of the present invention, the barrier electric field is generated in the border between the pixels by the guard electrode, thereby reducing the inter-pixel interference. Since the guard electrode is laminated on the electrodes electrically connected together or deposited in the channel, the barrier electric field is localized in each pixel. The generation of non-irregularity in the display due to the inter-pixel interference is controlled. The write operation results in an image of high quality. The barrier effect between the adjacent pixels is further assisted by arranging the rib structure on the guard electrode, by arranging the guard electrode on a rib structure, or by additionally arranging the guard electrode on the counter substrate.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electrophoretic display device for presenting an image by moving charged particles between a pair of display electrodes across which a voltage is applied, said electrophoretic display device comprising:

a pair of substrates arranged with a predetermined gap maintained therebetween;

a dispersing fluid disposed between said pair of substrates;

a plurality of charged particles mixed in the dispersing fluid;

at least a pair of display electrodes arranged on one of the substrates and defining a pixel; and a guard electrode arranged at a border between two adjacent pixels, wherein said guard electrode limits the movement of said charged particles to within a single pixel and, (1) wherein said guard electrode is set at a potential higher than each of said display electrodes of two adjacent pixels with the border therebetween if said particles are positively charged, or (2) wherein said guard electrode is set at a potential lower than each of said display electrodes of two adjacent pixels with the border if said particles are negatively charged.

2. An electrophoretic display device according to claim 1, wherein said display electrodes arranged on both sides of said border are biased at the same potential.

3. An electrophoretic display device according to claim 2, wherein said display electrodes arranged on both sides of said border are fabricated of a unitary conductor structure.

4. An electrophoretic display device according to claim 2, further comprising an insulator laminating said guard electrode, said insulator disposed on display electrodes on both sides of the border.

5. An electrophoretic display device according to claim 4, further comprising an electric shield electrode sandwiched between said guard electrode and said display electrodes.

6. An electrophoretic display device according to claim 2, wherein said guard electrode is arranged on a bottom surface of a channel formed in the border between the pixels.

7. An electrophoretic display device according to claim 1, further comprising a rib structure formed on top of said guard electrode.

8. An electrophoretic display device according to claim 1, further comprising a rib structure formed on a surface of one of said substrates facing a top of said guard electrode.

9. An electrophoretic display device according to claim 1, further comprising a second guard electrode arranged on a surface of one of said substrates facing a top of said guard electrode and having a portion overlapping said guard electrode if viewed in a direction normal to said substrates.

10. An electrophoretic display device according to claim 1, further comprising a rib structure formed in the border on at least one of said substrates wherein said guard electrode is arranged on a top surface of said rib structure.

11. An electrophoretic display device according to claim 1, further comprising a common electrode arranged on one of said substrates and facing the other of said substrates bearing said guard electrode, and a dielectric layer disposed on said common electrode.

12. An electrophoretic display device according to claim 1, wherein said guard electrode surrounds the pixel along the border.

13. A method of driving an electrophoretic display device for presenting an image by moving charged particles between a pair of display electrodes across which a voltage is applied, the electrophoretic display device comprising a pair of substrates arranged with a predetermined gap maintained therebetween, a dispersing fluid disposed between said pair of substrates, a plurality of charged particles mixed in the dispersing fluid, at least a pair of display electrodes arranged on one of the substrates and defining a pixel, and a guard electrode arranged in a border between two adjacent pixels, said method comprising the steps of:

limiting the movement of the charged particles to within a single pixel by (1) biasing the guard electrode at a potential higher than each of the display electrodes of the two adjacent pixels with the border therebetween if the particles are positively charged, or (2) biasing the guard electrode at a potential lower than each of the display electrodes of the two adjacent pixels with the border therebetween if the particles are negatively charged.

14. A method according claim 13, wherein the voltage between the guard electrode and the display electrodes with the border arranged therebetween is equal to or lower than the voltage which causes the charged particles to drift in the display electrodes throughout an entire drive period of time.

15. A method according to claim 13, wherein the display state of each pixel is switched by fixing the potential of the guard electrode and one of the pair of display electrodes in contact with the border, and by varying the potential of the other display electrode, and wherein throughout the period of the display state of the pixel, the display state of the pixel is maintained by setting the other display electrode to different potentials in response to the display state.

16. A method according to claim 13, wherein the polarity of the voltage between the guard electrode and the display electrode in contact with the border is inverted during a period of time.

17. An electrophoretic display device for presenting an image by moving charged particles between a pair of display electrodes across which a voltage is applied, said electrophoretic display device comprising:

a pair of substrates arranged with a predetermined gap maintained therebetween;

a dispersing fluid disposed between said pair of substrates;

a plurality of charged particles mixed in the dispersing fluid;

at least a pair of display electrodes arranged on one of the substrates and defining a pixel; and guard electrodes means, arranged at a border between two adjacent pixels, for limiting movement of the charged particles to within a single pixel, wherein said guard electrodes means is set at a potential higher than each of said display electrodes of two adjacent pixels with the border therebetween when said particles are positively charged.

18. An electrophoretic display device for presenting an image by moving charged particles between a pair of display electrodes across which a voltage is applied, said electrophoretic display device comprising:

a pair of substrates arranged with a predetermined gap maintained therebetween;

a dispersing fluid disposed between said pair of substrates;

a plurality of charged particles mixed in the dispersing fluid;

at least a pair of display electrodes arranged on one of the substrates and defining a pixel; and guard electrodes means, arranged at a border between two adjacent pixels, for limiting movement of the charged particles to within a single pixel, wherein said guard electrode means is set at a potential lower than each of said display electrodes of two adjacent pixels with the border when said particles are negatively charged.

* * * * *